3,423,089
Patented Jan. 21, 1969

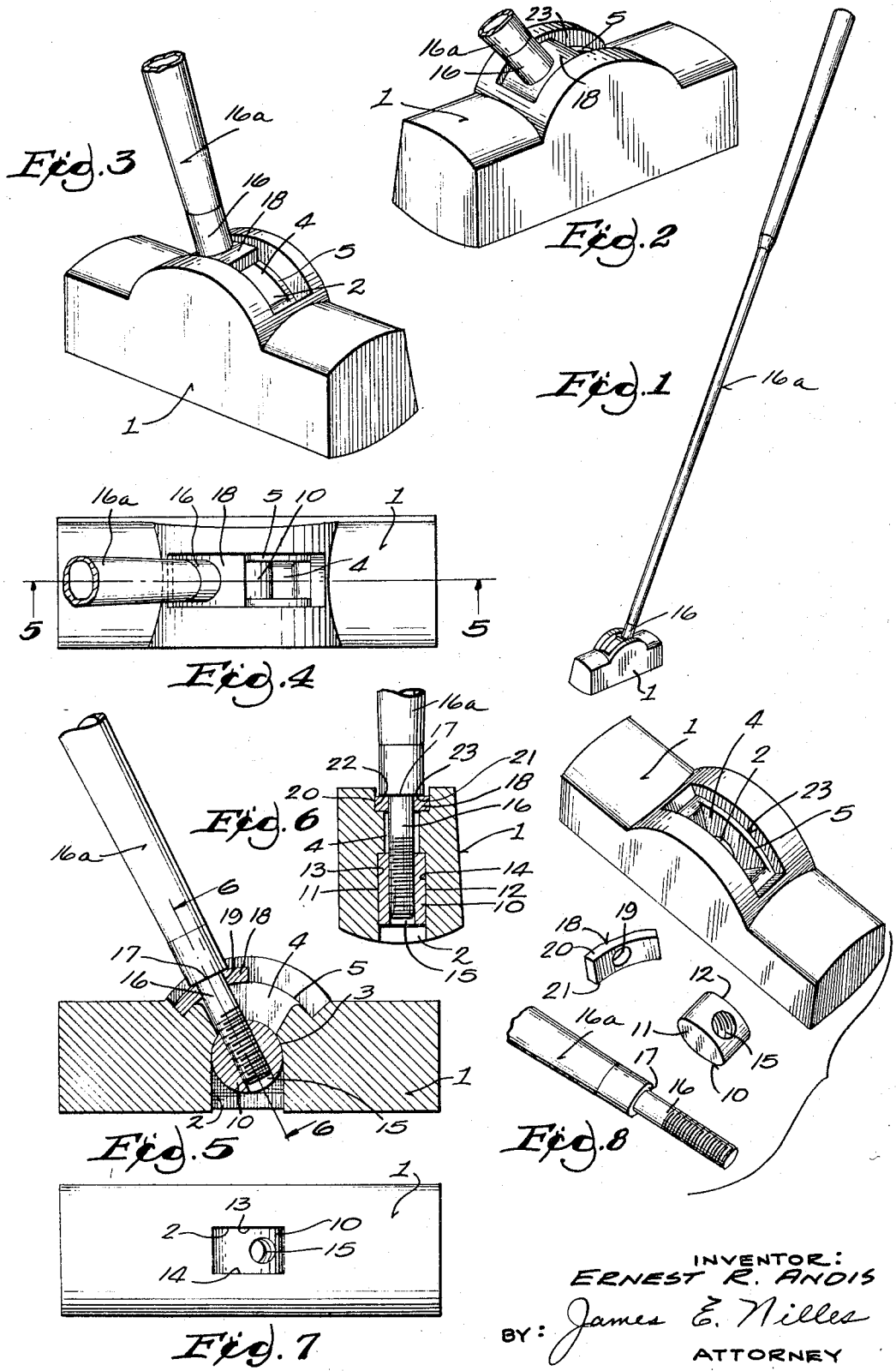

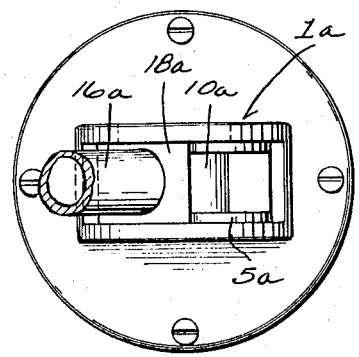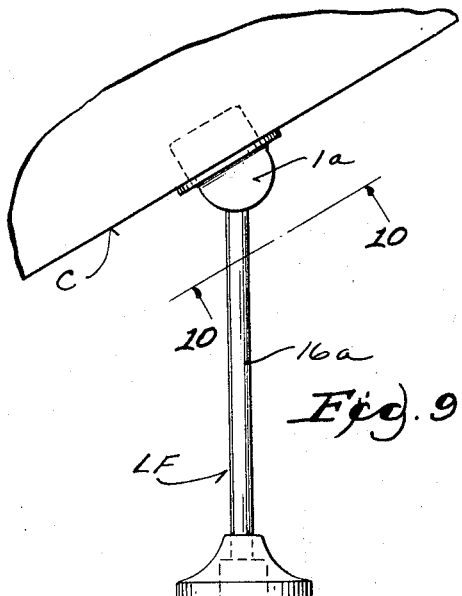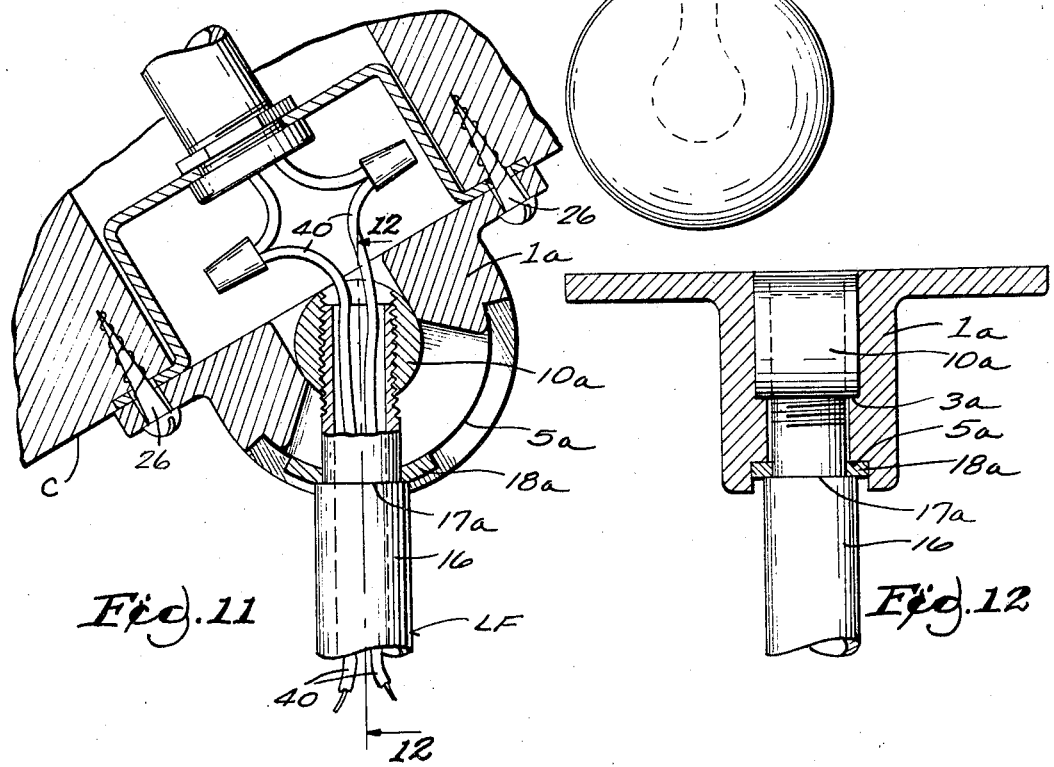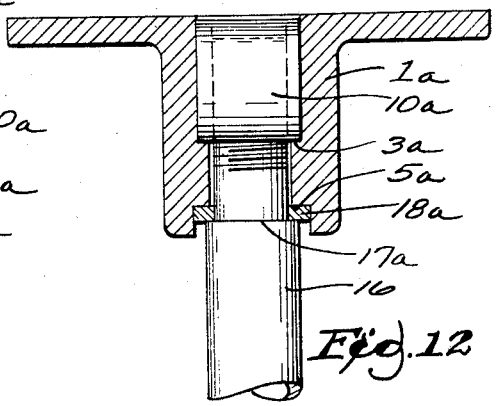
INVENTOR:
ERNEST R. ANDIS
BY: James E. Niller
ATTORNEY

United States Patent Office

3,423,089
ADJUSTABLE PIVOTAL CONNECTION MECHANISM WITH LOCKING MEANS
Ernest R. Andis, 3528 N. Bay Drive,
Racine, Wis. 53402
Filed Mar. 11, 1966, Ser. No. 533,620
U.S. Cl. 273—80.1     3 Claims
Int. Cl. A63b *67/00*; F16m *11/10*

ABSTRACT OF THE DISCLOSURE

A mechanism for pivotally connecting two members together including a generally cylindrical nut which is snugly seated in a complementary opening and a locking clamp engaged between an arcuate surface on one member and a shoulder on the other member to function as a locking means between the members.

---

This invention relates to pivotal connecting mechanism for forming a swingable connection between two relatively movable parts which are to be adjustably and fixedly connected together in any one of a number of selected positions.

Connections of this general type are known, such as ball and socket joints for example, wherein one part can be swung to a position relative to the other and locked in that position.

The present invention provides an improved connection of the above type wherein one part is swingable only in one plane in respect to the other part and has improved locking means which provides exceptionally good holding ability. Furthermore, the arrangement is such that the parts are rigidly held against relative movement in other planes, and the locking means can be loosened and tightened without tools and without disassembling the mechanism.

A more specific object of the invention is to provide an improved, adjustable head golf club having a pivotal connection of the above type.

Another object is to provide an improved lighting fixture of the above type.

These and other advantages and objects of the invention will appear hereinafter as this disclosure progresses, reference being had to the accompanying drawing, in which:

FIGURE 1 is a perspective view of a golf club head embodying my invention and taken generally from above to the side and from one end thereof;

FIGURE 2 is another perspective view of the head shown in FIGURE 1 but on an enlarged scale and taken generally from above and from the opposite side and end than that shown in FIGURE 1;

FIGURE 3 is a perspective view of the head shown in FIGURE 2 but taken generally from the other end thereof;

FIGURE 4 is a plan view of the head;

FIGURE 5 is a cross sectional view taken generally along line 5—5 in FIGURE 4;

FIGURE 6 is a cross sectional view taken generally along line 6—6 in FIGURE 5;

FIGURE 7 is a bottom view of the head;

FIGURE 8 is a perspective view of the parts in disassembled relationship;

FIGURES 9 to 12 show a modification of the invention, FIGURE 9 being an elevational view of the invention as applied to a ceiling light fixture;

FIGURE 10 is a view taken along line 10—10 in FIGURE 9, but enlarged;

FIGURE 11 is an enlarged, fragmentary view of a portion of the fixture shown in FIGURE 9, but in cross section, and FIGURE 12 is a sectional view taken along line 12—12 in FIGURE 11.

While the invention will be shown and described as applied to a golf club and a light fixture for the purpose of illustrating the invention, it will be understood that it is also susceptible of many other uses.

FIGURES 1 to 8

Referring in greater detail to the drawings, the embodiment of the invention shown in FIGURES 1 to 8 includes a golf putter head 1 having a recess 2 (FIGURE 5) with an arcuate or generally semi-circular surface 3, through which an opening 4 extends to the upper side of the head. Adjacent the upper end of the opening, the head has an arcuate surface 5 which complements surface 3, that is to say, surfaces 3 and 5 are generally formed by radii having the same center.

A cylindrical nut 10 is located in recess 2 and is of such a width between its flat sides 11 and 12 that it forms a snug but sliding fit with the flat side walls 13 and 14 of recess 2. Furthermore, this cylindrical nut 10 is of such a diameter that it complements the arcuate, internal surface 3 (FIGURE 5) to form a continuous abutting engagement therewith.

The nut 10 has a threaded hole 15 which threadably receives the threaded end of a rod 16 which in turn extends into the opening 4. Rod 16 has a shoulder 17, and an arcuate clamp 18 has a central hole 19 for mounting the clamp on the rod where it bears against this shoulder 17. The arcuate shape of clamp 18 is such that it complements and can bear firmly and evenly (FIGURES 5 and 6) against the arcuate external surface 5 of the head 1.

The rod 16 is adapted to be rigidly fixed to the golf club handle 16a and could be made as one piece therewith. Turning of the handle in such a direction to screw the rod or handle into the nut 10 causes the shoulder 17 to force the clamp 18 tightly against surface 5. It will be noted clamp 18 is of some length to provide a friction engaging area of substantial size, and of a width to clamp at both sides of opening 4 against the head. Furthermore, because the clamp is located radially a distance from the cylinder nut 10, good holding leverage against accidental movement of the handle is provided. Relative movement of the parts in any other than in the intended plane is prevented because of the fit of nut 10 in the recess 2 and also because the sides 20 and 21 of clamp 18 abut against the sides 22 and 23 of the slotted recess 24 at the outer end of the opening 4.

FIGURES 9 to 12

Referring now to the embodiment of the invention as shown in FIGURES 9 to 12, parts corresponding to generally similar parts in FIGURES 1 to 8, have been correspondingly numbered together with the suffix *a*.

Here the invention is shown as applied to a lighting fixture LF which is adapted to be fixed to an inclined ceiling C of a building so that the rod 16a hangs in a vertical direction. It is an easy matter to align the rod in a vertical position after the mounting head 1a has been secured to the ceiling by screws 26 or in any other suitable manner. This adjustment can be made from below, simply by turning and thus backing off the rod 16a from the cylindrical nut 10a adjusting it in a vertical position, and then turning the rod in the opposite direction to engage it more fully in the nut, causing the shoulder 17a of the rod to force the clamp 18a against arcuate surface 5a of mounting head 1a.

Rod 16a may be of any length and tubular to accommodate electric wires 40 located inside.

There is no need to adjust the rod 16a in the other planes but instead the fixture will be "plumb" in other planes because of the construction referred to earlier.

*Rèsumè*

In either modification of the invention, the improved pivot connection permits the rod to be swung only in one plane while at the same time holding it against lateral movement in other directions; the lock nut is snugly oscillatable within its complementary opening and the clamp is located a distance away from it to provide good locking leverage against its complementary curved surface. To adjust or disassemble the joint, it is only necessary to loosen the rod by unscrewing it. Thus adjustment can be easily made and yet the joint holds the parts in rigid connection.

Various modes of carrying out the invention are contemplated as being within the scope of the following claims particularly pointing out and distinctly claiming the subject matter which is regarded as the invention:

1. Pivotal connecting mechanism comprising, a head having an opening extending in one direction therethrough, said opening defining a generally arcuate internal surface and two opposed internal flat sides extending in said one direction within the head, said head also having a slotted recess extending along said external arcuate surface, said slotted recess having opposed side walls, a generally cylindrical nut located in said opening and having opposed flat sides which abut against said internal flat sides of said opening, said nut being of such diameter so as to provide an arcuate surface that complements and abuts snugly against said arcuate internal surface, a rod extending into said opening and threadably engaged in said nut and having a shoulder spaced from said nut, an external arcuate surface formed on said head and around said opening, and a clamp slidably mounted on said rod and between said external arcuate surface and said shoulder, said clamp setting entirely within said recess and having two sides which complement and bear against said recess side walls for sliding abutment therewith to prevent lateral movement of said rod relative to said head in respect to the direction in which said rod is pivotally swingable, whereby when said rod is threadably tightened into said nut, said shoulder causes said clamp to abut tightly against said external arcuate surface and lock said rod relative to said head.

2. An adjustable head golf club comprising, a head having an opening extending in one direction therethrough, said opening defining a generally arcuate internal surface and two opposed internal flat sides extending in said one direction within the head, said head also having a slotted recess extending along said external arcuate surface, said slotted recess having opposed side walls, a generally cylindrical nut located in said opening and having opposed flat sides which abut against said internal flat sides of said opening, said nut being of such diameter so as to provide an arcuate surface that complements and abuts snugly against said arcuate internal surface, a handle extending into said opening and threadably engaged in said nut and having a shoulder spaced from said nut, an external arcuate surface formed on said head and around said opening, and a clamp slidably mounted on said handle and between said external arcuate surface and said shoulder, said clamp setting entirely within said recess and having two sides which complement and bear against said recess side walls for sliding abutment therewith to prevent lateral movement of said rod relative to said head in respect to the direction in which said rod is pivotally swingable, whereby when said handle is threadably tightened into said nut, said shoulder causes said clamp to abut tightly against said external arcuate surface and lock said handle relative to said head.

3. A lighting fixture comprising a mounting head having means for securing it to a ceiling or the like, said head having an opening extending in one direction therethrough, said opening defining a generally arcuate internal surface and two opposed internal flat sides extending in said one direction within the head, said head also having a slotted recess extending along said external arcuate surface, said slotted recess having opposed side walls, a generally cylindrical nut located in said opening and having opposed flat sides which abut against said internal flat sides of said opening, said nut being of such diameter so as to provide an arcuate surface that complements and abuts snugly against said arcuate internal surface, a rod extending into said opening and threadably engaged in said nut and having a shoulder spaced from said nut, an external arcuate surface formed on said head and around said opening, a clamp slidably mounted on said rod and between said external arcuate surface and said shoulder, said clamp setting entirely within said recess and having two sides which complement and bear against said recess side walls for sliding abutment therewith to prevent lateral movement of said rod relative to said head in respect to the direction in which said rod is pivotally swingable, whereby when said rod is threadably tightened into said nut, said shoulder causes said clamp to abut tightly against said external arcuate surface and lock said rod relative to said head, and a light secured to the lower end of the rod.

References Cited

UNITED STATES PATENTS

| | | | |
|---|---|---|---|
| 1,139,823 | 5/1915 | Thomas et al. | 287—14 |
| 2,594,242 | 4/1952 | Wilson | 287—14 X |
| 2,691,532 | 10/1954 | Hayner | 287—14 |
| 1,595,047 | 8/1926 | Monson. | |
| 1,643,250 | 9/1927 | Longsworth | 273—79 |
| 2,644,689 | 7/1953 | Putnam | 273—79 |
| 3,212,740 | 10/1965 | Greenberg | 248—181 X |

ANTON O. OECHSLE, *Primary Examiner.*

U.S. Cl. X.R.

240—78; 248—185, 299, 343; 287—14